United States Patent [19]

Inoue et al.

[11] Patent Number: 4,909,777
[45] Date of Patent: Mar. 20, 1990

[54] TENSIONER OR TOOTHED BELTS

[75] Inventors: Hiroyuki Inoue; Yoshihiro Kumagai; Yuichi Futami, all of Saitama, Japan

[73] Assignee: Tsubakimoto Chain Company, Japan

[21] Appl. No.: 310,861

[22] Filed: Feb. 14, 1989

[30] Foreign Application Priority Data

Feb. 15, 1988 [JP] Japan .............................. 63-17482[U]

[51] Int. Cl.⁴ .............................................. F16H 7/12
[52] U.S. Cl. ...................................... 474/110; 474/135
[58] Field of Search ................ 474/101, 117, 109–111, 474/133, 135, 136, 138; 60/325; 254/93 R, 93 VA

[56] References Cited

U.S. PATENT DOCUMENTS 4,539,001  9/1985  Okabe .............................. 474/110 X
4,708,696  11/1987  Kimura et al. ....................... 474/103

Primary Examiner—Thuy M. Bui
Attorney, Agent, or Firm—Howson & Howson

[57] ABSTRACT

A hydraulically actuated tensioner of a toothed belt. A piston slidable with clearance in a cylinder forms front and rear oil-filled chambers communicating through a passage in the piston with a check valve for restricting flow in one direction. A piston rod extending from one end of the piston is urged by a spring, through the front chamber, against a roller to impart tension on the belt. An oil reservoir communicating with the front chamber is enclosed by a spring-biased diaphragm for maintaining the oil pressure in the chambers above atmospheric pressure at all times.

6 Claims, 3 Drawing Sheets

TENSIONER FOR TOOTHED BELTS

SUMMARY OF THE INVENTION

This invention relates to a tensioner for a toothed belt; and more particularly to a hydraulically actuated tensioner for preventing unmeshing of teeth of a toothed belt even when driving a camshaft of an engine subject to reverse running, and for maintaining continuous operation even when there is oil leakage or air infiltration in the hydraulic actuator.

It is often necessary to impart tension to a toothed belt in order to prevent unmeshing of its teeth. For example, where the belt is used for driving a camshaft of an engine, excessive changes in belt tension may occur with wide variations in ambient temperature due to the different coefficients of expansion of the belt and the body of the engine. Vibrations, noise, unmeshing of teeth, and the like, may result. Accordingly, belt tension must be maintained within a suitable range.

The basic construction and principle of operation of hydraulically actuated belt tensioners are well-known. Certain tensioners include a piston rod extending from a piston loosely fitted within a cylinder. The piston divides the cylinder into front and rear chambers filled with oil, and a spring urges the piston rod against a pressure plate or roller to maintain a desired tension in the belt. A passage and a one-way check valve in the piston communicates between the chambers allowing quick retraction when the belt tightens but slow return when it relaxes. One of the chambers includes a diaphragm for accommodating the difference in volumes caused by the piston rod.

Since the flow between the chambers is caused by the difference in the internal pressure, tensioner response is too slow; and it is likely that rapid relaxation of tension in the belt will not be timely removed. There is also fear of the diaphragm fracturing due to excessive deformation, and tensioner deterioration due to air infiltration. For instance, retraction of the piston produces a vacuum in the chamber surrounding the piston rod causing air to enter the chamber through the clearance at a seal around the piston rod, and to mix with the oil.

According to the present invention, there is provided a tensioner for a toothed belt in which a piston rod extends from a piston slidably fitted in a cylinder which is divided by the piston into two chambers filled with oil. The piston and rod are biased in a protruding direction by a spring. An oil reservoir communicates between the chambers and with one chamber including a diaphragm. Pressing means disposed outside of the diaphragm maintains a positive pressure in the chambers and reservoir higher than the atmospheric pressure whereby air is prevented from entering through any clearances or cracks. In addition, the positive pressure improves the oil flowability and limits deformation of the diaphragm.

BRIEF DESCRIPTION OF THE DRAWINGS

These and other novel features of the invention will become more apparent from the following detailed description when considered in conjunction with the accompanying drawings wherein.

DETAILED DESCRIPTION

Figure 1:
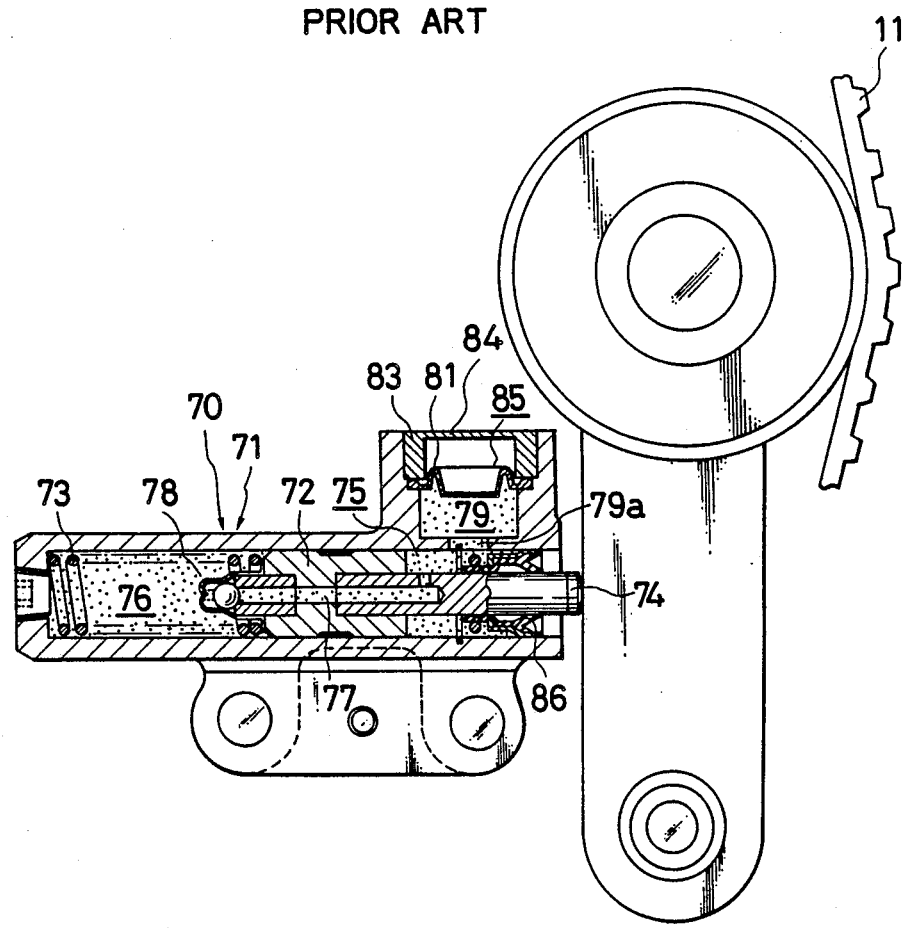
FIG. 1 is a sectional view of a tensioner of the prior art.

Referring now to the drawings wherein like characters designate like or corresponding parts throughout the several views, there is shown in FIG. 1, a tensioner 70 of the prior art such as disclosed in U.S. Pat. No. 4,708,696. A piston 72 is loosely fitted with a slight clearance into a cylinder 71 to form front and rear chambers 75 and 76 filled with oil. A spring 73 applies a projecting force to a piston rod 74 fixed to piston 72. A one-way check valve 78 is disposed within an oil passage 77 in piston 72 which communicates between front and rear chambers 75 and 76. Check valve 78 permits oil flow through passage 77 into rear chamber 76 but not in the reverse direction into front chamber 75. An oil reservoir 79 communicates with front chamber 75 which includes a diaphragm 81.

Oil in reservoir 79 flows in and out of front chamber 75 through an opening 79a varying the volume of reservoir 79. This is accommodated by deformation of diaphragm 81. A cap 83, provided with an air-communicating hole 84, keeps the exterior pressure on diaphragm 81 at ambient or atmospheric pressure. Deformation of diaphragm 81 occurs due to the difference in the pressure between the inside and outside of oil reservoir 79.

When belt 11 tightens, piston 72 retracts and oil flows from rear chamber 76 into front chamber 75 through a slight clearance. Since the cross sectional area of front chamber 75 is smaller than of rear chamber 76 because of piston rod 74, the excess oil flows into reservoir 79 through opening 79a. Consequently, diaphragm 81 deforms outwardly against the atmospheric pressure to accommodate the excess volume of oil.

On the other hand, when the belt 11 loosens, spring 73 urges piston rod 72 outward and oil flows from the front chamber 75 to rear chamber 76 through check valve 78 as well as through the clearance. As diaphragm 81 is subjected to the atmospheric pressure, the oil in front chamber 75 and in reservoir 79 flows into rear chamber 76 and diaphragm 81 deforms inwardly.

Figure 2:
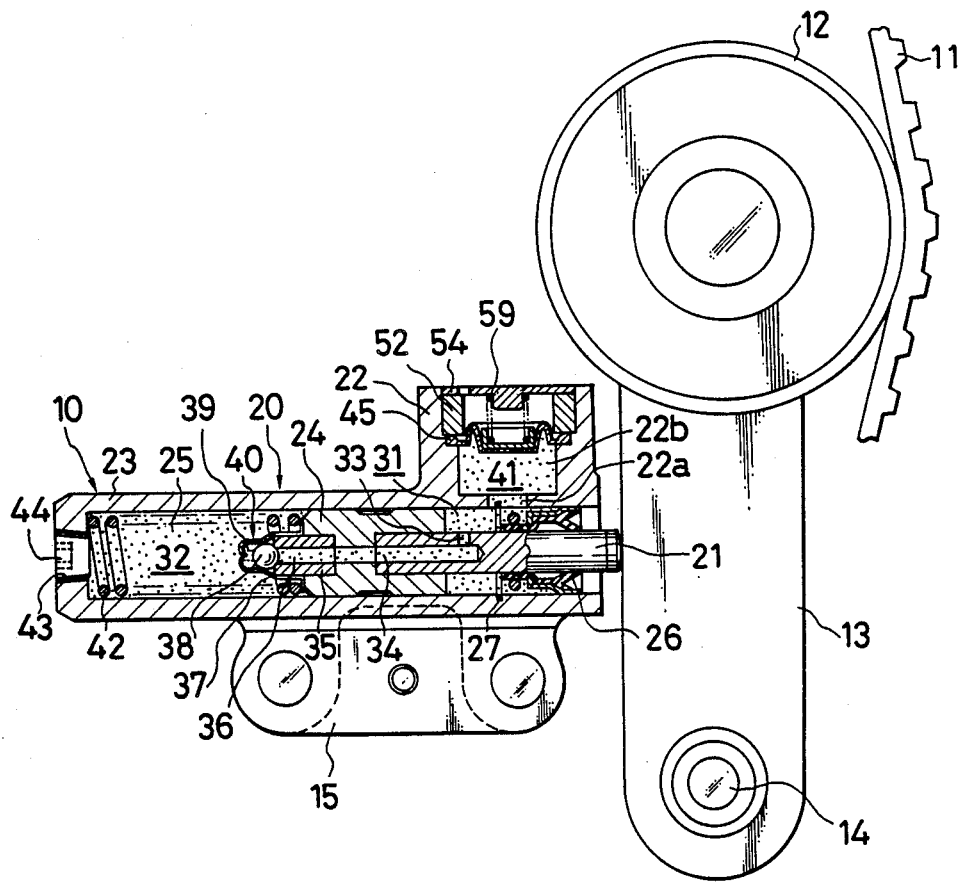
FIG. 2 is a sectional view of a tensioner for a toothed belt according to the invention.

FIG. 2, in contradistinction, is an improved tensioner 10 for a toothed belt 11 according to the invention. A plate 13, pivotally connected with a bolt 14 to support structure not shown, carries a roller 12 which forcedly contacts a relaxable portion of belt 11. A piston rod 21 pressed extending from a cylinder 20 fixed by lug 15 to the support structure presses plate 13 for tensioning belt 11. Cylinder 20 includes a front or reservoir portion 22 and a rear portion or main body 23, and slidably receives piston 24 with a slight clearance. Piston rod 21 is fixed to piston 24. An annular fastener 27 fixed to cylinder 20 acts as a stopper when piston rod 21 reaches the fully extended position. A seal 26 about rod 21 prevents leakage of oil 25 from cylinder 20.

Piston rod 21 is provided within an oil passage composed of a lateral hole 33 opening into a front chamber 31 and a longitudinal hole 34, subsequent to lateral hole 33, leading toward a rear chamber 32. A valve seat 35, fitted to piston 24, is provided with a longitudinal hole 36 communicating between hole 34 and rear chamber 32. A compression spring 42, placed between a retainer 37 and an end surface of main body 23 of the cylinder 20, urges a ball 38 held within the center part of retainer 37 against the opening of hole 36 with sufficient force to allow oil 25 to flow from front chamber 31 toward rear chamber 32. An opening 43 and a plug 44 is provided for introducing oil 25 into cylinder 20. An oil reservoir 41 accommodates the variation of the volume between the front chamber and the rear chamber when the oil flows in or out of reservoir 41 due to movement of piston 24.

Spring 42 applies a tension force to toothed belt 11 through roller 12 or the like. When belt 11 stretches due to a decrease in ambient temperature, the belt tension decreases and piston rod 21 moves forward under the force of spring 42 to return the belt tension to its original value. That is, hydraulic pressure in front chamber 31 increases due to piston rod 21 advancing. Check valve 40 therefore opens and enables rapid advance of rod 21 to effect a quick recovery of the belt tension.

In a case where the toothed belt 11 drives a camshaft of an engine and the engine momentarily rotates in the reverse direction when starting, for example less than one rotation, the tension force of the belt 11 increases for a short period and piston rod 21 experiences a high reaction force in the retracting direction. Check valve 40 being closed, piston rod 21 cannot retract quickly because oil can flow only in the small clearance around piston 20. Rod 21 will retract gradually and finally settle at a position where the reaction force and the force of the spring 42 are balanced. Thus, roller 12 will quickly take up the slack if toothed belt 11 and prevent it from "leaping" as a loose belt.

Figure 3:
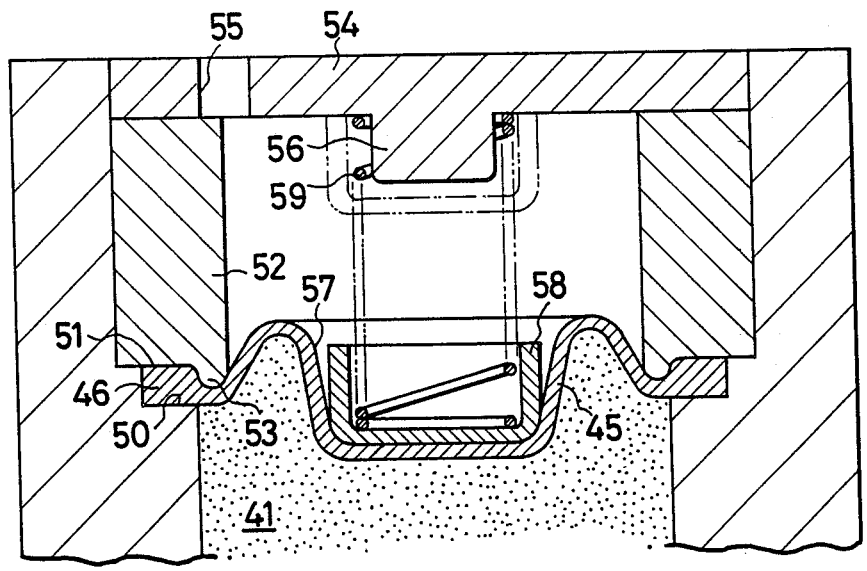
FIG. 3 is an enlarged sectional view of a reservoir portion of the tensioner of FIG. 1.

Referring now to FIG. 3, first and second annular stepped portions 50, 51 are formed within reservoir portion 22 of cylinder 20. An annular edge 46 of a diaphragm 45 is fitted into stepped portion 50. A cylindrical pressing ring 52, interlocked to stepped portion 51, includes an annular projection 53 fixing annular edge 46 of diaphragm 45 with stepped portion 50. Diaphragm 45 is capable of deforming due to the variation of the volume according to the flow of oil 25 in and out of an oil chamber 22b of reservoir portion 22. Diaphragm 45 also prevents the oil from leaking and foreign matter from entering, and minimizes the size of the reservoir.

A pressing plug 54 having a small opening 55 is interlocked with the outside of pressing ring 52 by a convex portion 56 protruding from the center on the side facing diaphragm 45. A cap 58 fitted to a center recess 57 of diaphragm 45 accommodates convex portion 56. A pressing means or spring 59 is interposed between convex portion 56 and cap 58 and presses diaphragm 45 in the direction of reservoir 41. The depth of cap 58 is greater than the length of convex portion 56 or the compressed length of spring 59. Accordingly, the gauge pressure in reservoir 41 and the front chamber 31 is constantly maintained higher than the ambient or atmospheric pressure.

When piston rod 21 projects by means of spring 42, ball 38 separates from valve seat 35 and oil flows into the rear chamber rapidly due to the pressing force of spring 59 to chamber 31 and oil reservoir 41. Piston rod 21 therefore advances rapidly, enabling toothed belt 11 to regain a predetermined tension force.

Figure 4:
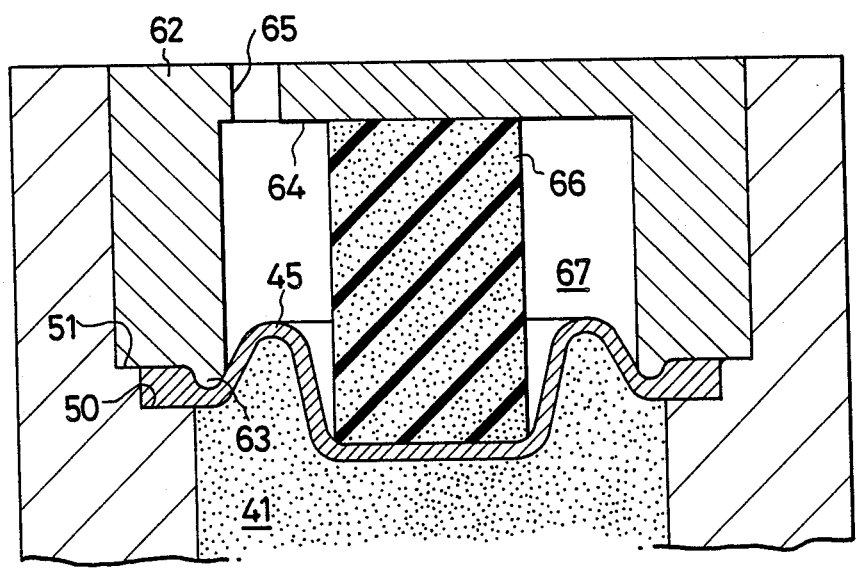
FIG. 4 is an enlarged sectional view of another embodiment of the reservoir portion of the tensioner of FIG. 1.

FIG. 4 shows a pressing means which constitutes a second embodiment of the invention. Diaphragm 45 is fitted within stepped portion 50. A cup-shaped plug 62 is fitted at one end to interlocked within stepped portion 51; and diaphragm 45 is fixed between an annular projection 63 and stepped portion 50. Pressing means or an air-permeable sponge 66 is interposed between diaphragm 45 and a bottom portion 64 of plug 62, and presses diaphragm 45 in the direction of oil reservoir 41.

As in the first embodiment, the pressure in oil reservoir 41 and the front chamber 31 is maintained higher than the ambient or atmospheric pressure by sponge 66 thereby preventing air penetration through the clearance between piston rod 21 and seal 26. Flowability into the rear chamber 32 and the response of the piston rod are also improved.

The disclosed embodiments are for illustrative purposes only, and should not be construed as limiting the invention. For example, the oil reservoir may be connected to the rear chamber, or the check valve may be omitted without affecting operation of the other components.

Some of the many advantages and novel features of the invention should now be readily apparent. For example, diaphragm 45 pressed by the pressing means maintains the gauge pressure of oil reservoir 41 and front chamber 31 higher than atmospheric pressure, and prevents air from penetrating through the clearance between piston rod 21 and seal 26. When piston rod 21 projects in case of reduction of the belt tension, the oil will flow rapidly toward the rear chamber, because the pressure of the front chamber is maintained higher than atmospheric pressure. Consequently, the response for restoring the belt tension is improved, and deformation of diaphragm 45 may be controlled.

It will be understood that various changes in the details, steps and arrangement of parts, which have been herein described and illustrated in order to explain the nature of the invention, may be made by those skilled in the art within the scope of the invention as expressed in the appended claims.

We claim:

1. A tensioner for a toothed belt including:
   a piston rod extending from a piston slidably fitted in a cylinder which is divided by said piston into front and rear chambers filled with oil, said piston rod being biased in a protruding direction by a spring; and
   an oil reservoir in communication with said front or rear chambers and being covered by a diaphragm whereby the oil in said reservoir is on one side of the diaphragm and the opposite side of the diaphragm is exposed to an exterior space, and having force-exerting means disposed on said opposite side of said diaphragm for urging the diaphragm in a direction to compress the reservoir.

2. A tensioner according to claim 1 wherein: said force-exerting means includes a spiral compression spring.

3. A tensioner according to claim 1 wherein: said force-exerting means includes an air-permeable sponge.

4. In a tensioner for a belt drive system including a rod extending from a piston slidable in a cylinder with clearance therebetween, the piston dividing the cylinder into first and second chambers filled with oil and spring means urging the rod through one of the chambers and against the belt, the improvement comprising:
   pressing means for maintaining the oil pressure in the chambers above the ambient pressure comprising a passage communication with one of said chambers, and a diaphragm disposed in said passage and separating the oil within said one of said chambers from an exterior space whereby the oil is on one side of the diaphragm and the exterior space in on the other side of the diaphragm, and force-exerting means disposed on said other side of the diaphragm for urging the diaphragm toward said one of said chambers.

5. A tensioner according to claim 4 wherein: said force-exerting means includes a spiral compression spring.

6. A tensioner according to claim 4 wherein: said force-exerting means includes an air-permeable sponge.

* * * * *